United States Patent [19]
Choi

[11] Patent Number: 5,999,226
[45] Date of Patent: Dec. 7, 1999

[54] DUAL-SCREEN APPARATUS CAPABLE OF PREVENTING JITTER AND SCREEN CUTOFF

[75] Inventor: Sang Um Choi, Daeku, Rep. of Korea

[73] Assignee: LG Electronics Inc., Rep. of Korea

[21] Appl. No.: 08/773,579

[22] Filed: Dec. 27, 1996

[30] Foreign Application Priority Data

Dec. 29, 1995 [KR] Rep. of Korea ...................... 95/67387

[51] Int. Cl.$^6$ .................................................. H04N 5/445
[52] U.S. Cl. .......................... 348/564; 348/564; 348/588; 348/497; 348/566
[58] Field of Search .................................... 348/564, 565, 348/566, 567, 568, 569, 588, 497

[56] References Cited

U.S. PATENT DOCUMENTS

| | | | |
|---|---|---|---|
| 4,673,983 | 6/1987 | Sarugaku et al. ........................ | 348/566 |
| 4,987,491 | 1/1991 | Kaite et al. ............................... | 348/497 |
| 5,363,143 | 11/1994 | Duffield .................................. | 348/588 |
| 5,434,625 | 7/1995 | Willis ....................................... | 348/564 |
| 5,504,535 | 4/1996 | Abe .......................................... | 348/565 |
| 5,557,342 | 9/1996 | Eto et al. ................................. | 348/567 |
| 5,576,769 | 11/1996 | Lendaro .................................. | 348/564 |
| 5,726,715 | 3/1998 | Endress ................................... | 348/565 |
| 5,729,300 | 3/1998 | Ahn ......................................... | 348/565 |

*Primary Examiner*—John K. Peng
*Assistant Examiner*—Paulos Natnael
*Attorney, Agent, or Firm*—Ostrolenk, Faber, Gerb & Soffen, LLP

[57] ABSTRACT

An apparatus for composing two screens in a television which is capable of solving the problems of a jitter and a screen being cut off at the top and bottom portions caused by a non reference signal in composing two screens, includes a line memory for storing in the unit of lines a video signal for a main screen converted into a digital signal, a frame memory for storing in the unit of frames a video signal for a sub-screen converted into a digital signal, a mixing unit for receiving and mixing the outputs from the line memory and the frame memory to compose two screens, a D/A converter for converting an output from the mixing unit into an analog signal, an encoder for encoding an output from the D/A converter and outputting a double screen signal, a clock signal generator for receiving the horizontal synchronous signals for a main screen and a sub-screen, generating a clock signal corresponding thereto, dividing a horizontal fly back signal in a predetermined number in accordance with a division control signal and outputting the resultant signals, and a control signal generator for receiving an output from the clock signal generator to generate clock/timing pulse signals required in each unit and a read enable signal in accordance with the clock signal divided in a predetermined number when the above two memories read data.

4 Claims, 5 Drawing Sheets

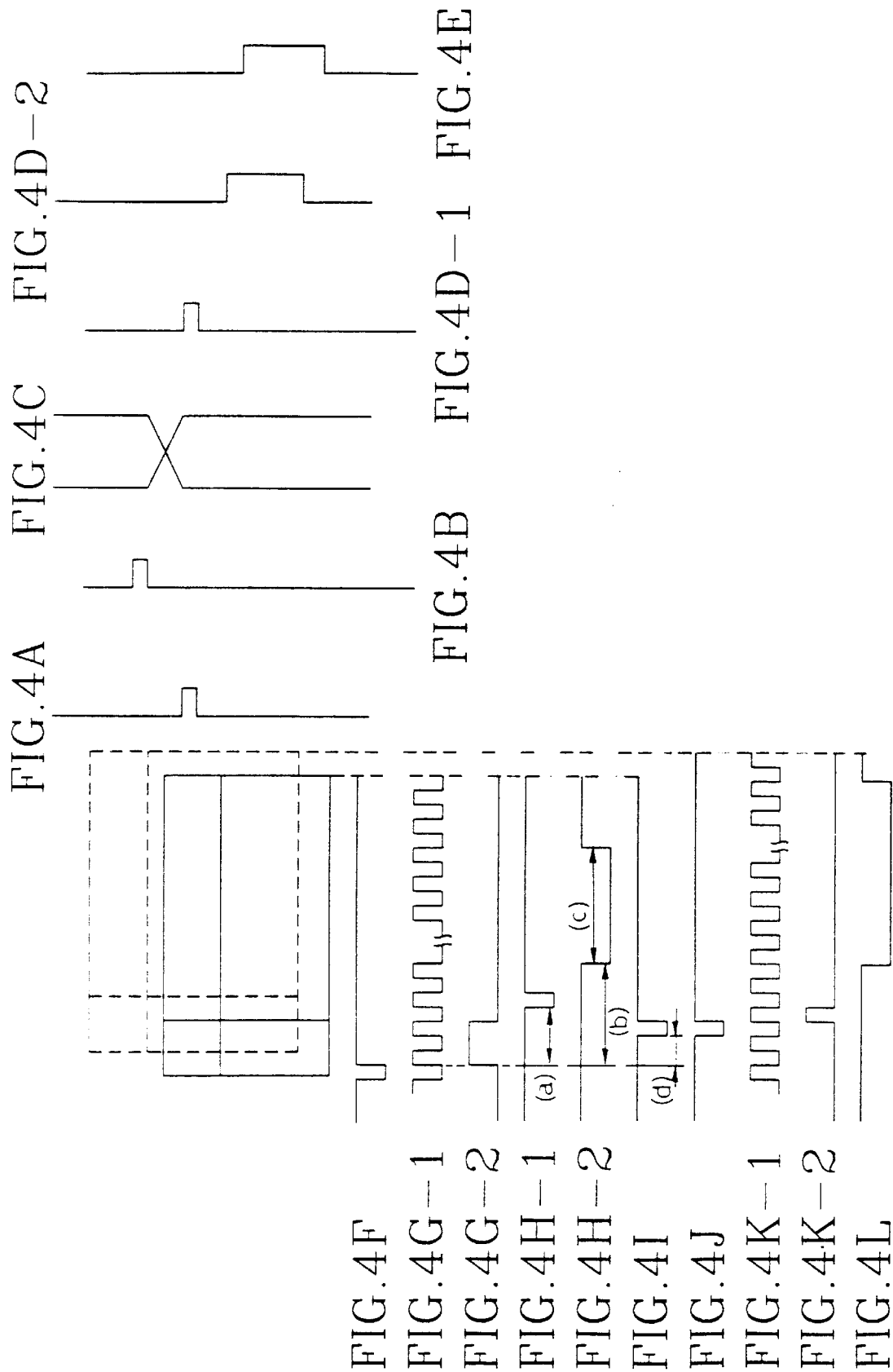

DUAL-SCREEN APPARATUS CAPABLE OF PREVENTING JITTER AND SCREEN CUTOFF

BACKGROUND OF THE INVENTION

1. Field of the Invention

The present invention relates to an apparatus for composing two screens in a television, and more particularly, to an improved apparatus for composing two screens in a television which is capable of solving the problems of a jitter and a screen being cut off at the top and bottom portions caused by a non reference signal in composing two screens.

2. Description of the Prior Art

Generally, as shown in FIG. 1, an apparatus for composing two screens on a television includes a first analog/digital (hereinafter, called A/D) converter 100 for converting a video signal for a main screen (VBS1) into a digital signal, a second A/D converter 110 for converting a video signal (VBS2) for a sub-screen into a digital signal, a line memory 120 for storing an output from the first A/D converter 100 in the unit of lines, a frame memory 130 for storing an output from the second A/D converter 110 in the unit of frames, a mixing unit 140 for receiving outputs from the line memory 120 and the frame memory 130 and mixing the outputs to compose two screens, a digital/analog (hereinafter, called D/A) converter 150 for converting the output from the mixing unit 140 into an analog signal, an encoder 160 for encoding an output from the D/A converter 150 for a display on the screen and outputting a double screen signal (DSS), a first clock signal oscillator 170 for receiving a horizontal synchronous signal (Sync1) for a main screen and generating a clock signal corresponding thereto, a second clock signal oscillator 180 for receiving an horizontal synchronous signal (Sync2) for a sub-screen and generating a clock signal corresponding thereto, and a clock/timing generator 190 for receiving outputs from the first and second clock signal oscillators 170,180 and generating a clock signal and a timing pulse signal required in each unit.

With reference to FIGS. 1 and 2, the operation and effect of the apparatus for composing two screens on a television having the above construction will now be described in detail.

First, the first A/D converter 100 converts the video signal (VBS1) for a main screen into a digital signal appropriate for processing, and the line memory 120 stores in the unit of lines the video signal (VBS1) for a main screen converted into a digital signal in accordance with a write enable signal shown in FIG. 2E-2. Here, the signal shown in FIG. 2E-2 is used as the write enable signal.

Here, as shown in FIG. 2E-1, a reset signal applied to the line memory 120 is generated synchronized with the horizontal synchronous signal (Sync1) for a main screen in FIG. 2A, after a predetermined time (a) passes, and as shown in FIG. 2E-2, a write enable signal is generated synchronized with the horizontal synchronous signal (Sync1) for a main screen in FIG. 2A, after a predetermined time (b) passes to store a set number of samples (c) in the line memory 120.

The second A/D converter 110 converts the video signal (VBS2) for a sub-screen into a digital signal appropriate for processing. The frame memory 130 stores in the unit of frames the video signal (VBS2) for a sub-screen converted into a digital signal in accordance with a write enable signal shown in FIG. 2F-2.

Then, a reset signal (a control signal) applied to the frame memory 130 is generated synchronized with the horizontal synchronous signal (Sync2) for a sub-screen shown in FIG. 2B, and the write enable signal shown in FIG. 2F-2 is synchronized with the horizontal synchronous signal (Sync2) for a sub-screen, and a predetermined number of samples (i) in the frame memory 130 is stored after a predetermined time elapses.

Since data is read in a frequency twice as large as a write clock signal such as a read enable signal illustrated in FIGS. 2E-3 and 2F-1 when the data is read from the line memory 120 and the frame memory 130, the image data outputted from the line memory 120 and the frame memory 130 is twice compressed. Here, when data is read from the line memory 120, as shown in FIG. 2E-3, a number of samples in (e) identical to those in (c) of FIG. 2E-2 are read out after a predetermined time (d) passes from the horizontal synchronous signal (Sync1) for a main picture, and when data is read out from the frame memory 130, as shown in FIG. 2F-1, a number of samples in (g) identical to those in (i) of FIG. 2F-2 are read out, after a predetermined time (d+e) passes from the horizontal synchronous signal (Sync1) for a main screen.

Therefore, the outputs from the line memory 120 and the frame memory 130 are mixed in the mixing unit 140 to be converted into a two-screen analog video signal through the D/A converter 150. Then the analog video signal is inputted to the encoder 160 to be encoded into a combined video signal, and a double screen video signal (DSS) is outputted.

The clock/timing generator 190 receives a clock signal generated by the first and second oscillators 170,180, and synchronous signals (Sync1,Sync2) for a main screen and a sub-screen generates clock signal/timing pulse signals required in the first and second A/D converters 100,110, the line memory 120, the frame memory 130, the mixing unit 140, the D/A converter 150 and the encoder 160. The first clock signal oscillator 170 receives the horizontal synchronous signal (Sync1) for a main screen to generate a clock signal corresponding to a phase locked loop(hereinafter, called PLL)(not illustrated) provided therein, as shown in FIG. 2C, and the second clock signal oscillator 180 receives the horizontal synchronous signal (Sync2) for a sub-screen to generate a clock signal corresponding thereto, as shown in FIG. 2D. Here, the PLL is also used.

However, a division ratio of the PLL is increased by using the PLL so as to generate a clock signal corresponding to the horizontal synchronous signal, resulting in generating a noise or a jitter in accordance with a non reference signal.

Moreover, when a reference signal and a non reference signal are inputted as video signals for a main screen and a sub-screen, the phenomenon the sub-screen is cut off into top and bottom portions occurs due to a jitter and a difference of a vertical frequency.

Further, when two screens are displayed on a television having a larger width, if the screen ratio is set to be 4:3, nothing is displayed at the upper and lower portions of the double screen pictures thereof on a 16:9 screen, and when a display is carried out on an entire 16:9 screen, the screen ration becomes 8:9, resulting in lengthening a screen.

SUMMARY OF THE INVENTION

Accordingly, it is an object of the present invention to provide an improved apparatus for composing two screens in a television which is capable of preventing a generation of a jitter irrespective of a division ration of a PLL in displaying two screens.

It is another object of the present invention to provide an improved apparatus for composing two screens in a television in which two screens can be composed without a cutoff or a space by reading data at a frequency which is N times that of when writing data of a line memory and a frame memory when two screens are displayed.

To achieve the above object, there is provided an improved apparatus for composing two screens in a television which includes a line memory for storing in the unit of lines a video signal for a main screen converted into a digital signal, a frame memory for storing in the unit of frames a video signal for a sub-screen converted into a digital signal, a mixing unit for receiving and mixing the outputs from the line memory and the frame memory to compose two screens, a D/A converter for converting an output from the mixing unit into an analog signal, an encoder for encoding an output from the D/A converter and outputting a double screen signal, a clock signal generator for receiving the horizontal synchronous signals for a main screen and a sub-screen, generating a clock signal corresponding thereto, dividing a horizontal fly back signal in a predetermined number of signals in accordance with a division control signal and outputting the resultant signals, and a control signal generator for receiving an output from the clock signal generator to generate a clock signal and a timing pulse signal required in each unit and generate a read enable signal in accordance with the clock signal divided in a predetermined number when the line memory and the frame memory carries out a reading operation.

BRIEF DESCRIPTION OF THE DRAWINGS

The present invention will become more fully understood from the detailed description given hereinbelow and the accompanying drawings which are given by way of illustration only, and thus are not limitative of the present invention, wherein:

FIGS. 4A through 4L are output waveform diagrams of each block in FIG. 3; and

DETAILED DESCRIPTION OF THE PREFERRED EMBODIMENTS

Referring to the accompanying drawings, an apparatus for composing two screens in a television according to the present invention will now described in detail.

Figure 2A:
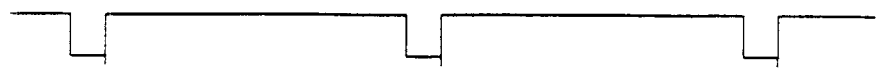
FIGS. 2A through 2F-2 are output waveform diagrams of each block in FIG. 1.
Figure 2B:
Figure 2C:
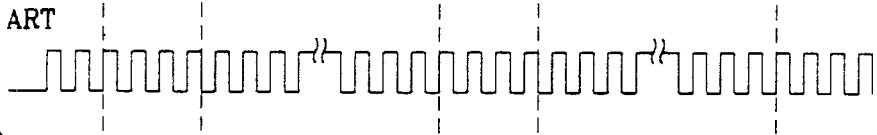
Figure 2D:
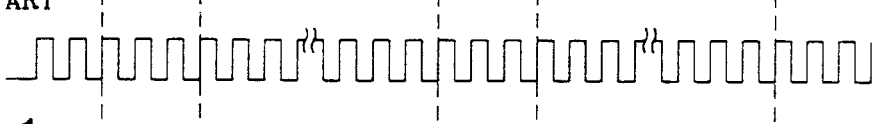
Figures 1, 2E:
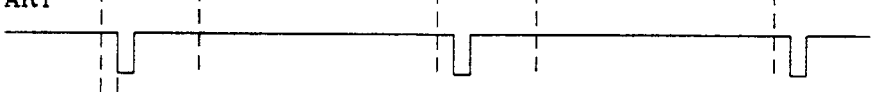
Figures 2, 2E:
Figures 2, 2E, 3:
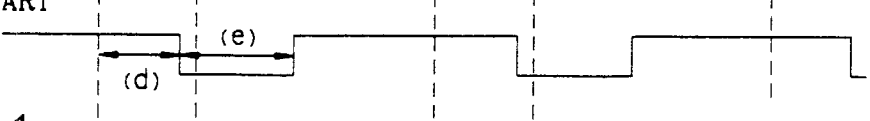
FIG. 3 is a block diagram showing an apparatus for composing two screens in a television according to the present invention.
Figures 1, 2F:
Figures 2, 2F:
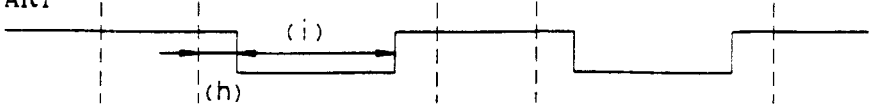
Figure 3:
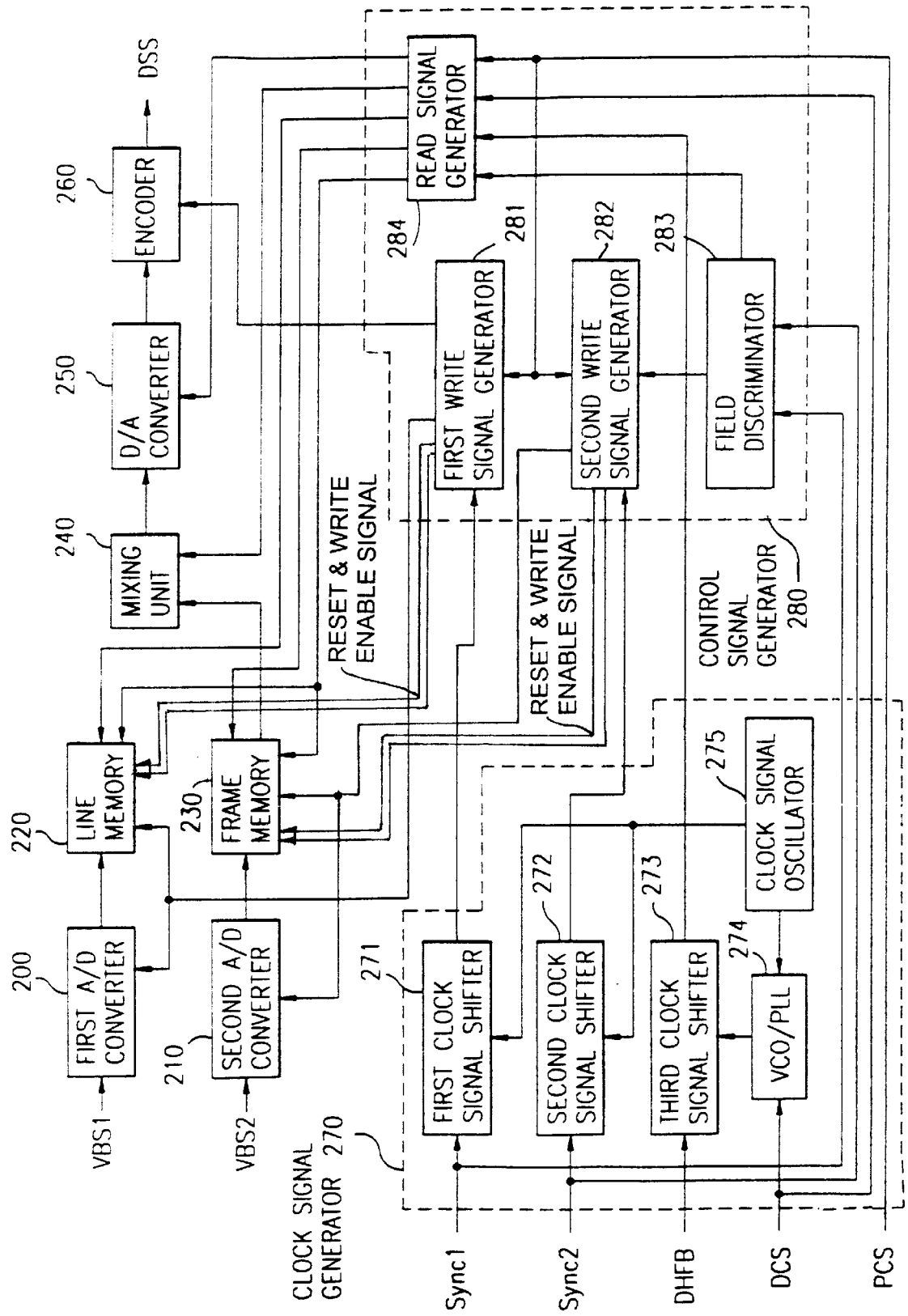

As shown in FIG. 3, an apparatus for composing two screens in a television according to the present invention includes a first A/D converter 200 for converting a video signal (VBS1) for a main screen into a digital signal, a second A/D converter 210 for converting a video signal (VBS2) for a sub-screen into a digital signal, a line memory 220 for storing an output from the first A/D converter 200 in the unit of lines, a frame memory 230 for storing an output from the second converter 210 in the unit of frames, a mixing unit 240 for receiving an output from the line memory 220 and the frame memory 230 and mixing them to compose two screens, a D/A converter 250 for converting an output from the mixing unit into an analog signal, an encoder 260 for encoding an output from the D/A converter into a signal which can be displayed on the scene and outputting a double screen signal (DSS), a clock signal generator 270 for receiving horizontal synchronous signals (Sync1,Sync2) for a main picture and a sub-picture to generate a clock signal corresponding thereto, receiving an horizontal fly back signal (DHFB), dividing it into a predetermined number of signals in accordance with a division control signal (DCS) and outputting the resultant signals, and a control signal generator 280 for receiving an output from the clock signal generator 270 to generate a clock signal and a timing pulse signal required in each unit and generate a read enable signal in accordance with a clock signal divided in a predetermined number of signals in the reading of the line memory 220 and the frame memory 230.

Here, the clock signal generator 270 includes a first clock signal shifter 271 for receiving the horizontal synchronous signal (Sync1) for a main screen, a second clock signal shifter 272 for receiving the horizontal synchronous signal (Sync2) for a sub-screen, a third clock signal shifter 273 for receiving the horizontal fly back signal (DHFB), and a voltage control oscillator (hereinafter, called VCO)/PLL unit 274 and a clock signal oscillator 275 for receiving the division control signal (DCS).

The control signal generator 280 includes a first write signal generator 281 for receiving an output signal and a position control signal (PCS) from the first clock shifter 271 and generating a first write signal, a second write signal generator 282 for receiving an output signal from the second clock signal shifter 272 and generating a second write signal, a field discriminator 283 for receiving the horizontal synchronous signals for the main screen and the sub-screen (Sync1,Sync2) and generating a discriminating signal, and a read signal generator 284 for receiving an output signal from the third clock signal shifter 273, a discriminating signal from the field discriminator 283, the division control signal (DCS), and the position control signal (PCS).

The operation and effect of the apparatus for composing two screens in a television according to the present invention having the above construction will now be described in detail.

First, the first A/D converter 200 converts the video signal (VBS1) for a main screen into a digital signal appropriate for processing. The line memory 220 stores in the unit of lines the video signal (VBS1) for a main screen converted into a digital signal in accordance with a write enable signal from a first write signal generator 281 in the control signal generator 280.

Then, the second A/D converter 210 converts the video signal (VBS2) for a sub-screen into a digital signal appropriate for processing. The frame memory 230 stores in the unit of frames the video signal (VBS2) for a sub-screen converted into a digital signal in accordance with a write enable signal from the second write signal generator 282 in the control signal generator 280.

Here, the digital video signals stored in the line memory 220 and the frame memory 230 are read at a frequency N times as large as the frequency used in recording. Therefore, the N times compressed video signal is inputted to the mixing unit 240. For example, the N is 2 in a twice compressed two screen mode, and the N is ⅓ in a ⅓ times compressed two screen mode.

Then, the outputs from the line memory 220 and the frame memory 230 are mixed in the mixing unit 240 and converted into a double screen analog signal through the D/A converter 250. The analog video signal is inputted to the encoder 260 to be encoded as a double screen complicated video signal, thereby outputted as a double screen video signal (DSS).

The operation of the clock signal generator 270 and the control signal generator 280 will now be described in more detail.

As shown in FIGS. 4A and 4F, of the synchronous signal for a main screen, an horizontal synchronous signal (Sync1) for a main screen shown in FIG. 4F is inputted to the first clock signal shifter 271 in the clock signal generator 270, and serves as a reference clock signal (shown in FIG. 4G-1) and a reset signal (shown in FIG. 4G-2) from the first write signal generator 281 in accordance with a clock signal from the clock signal oscillator 275 having a set oscillating frequency.

Figure 1:
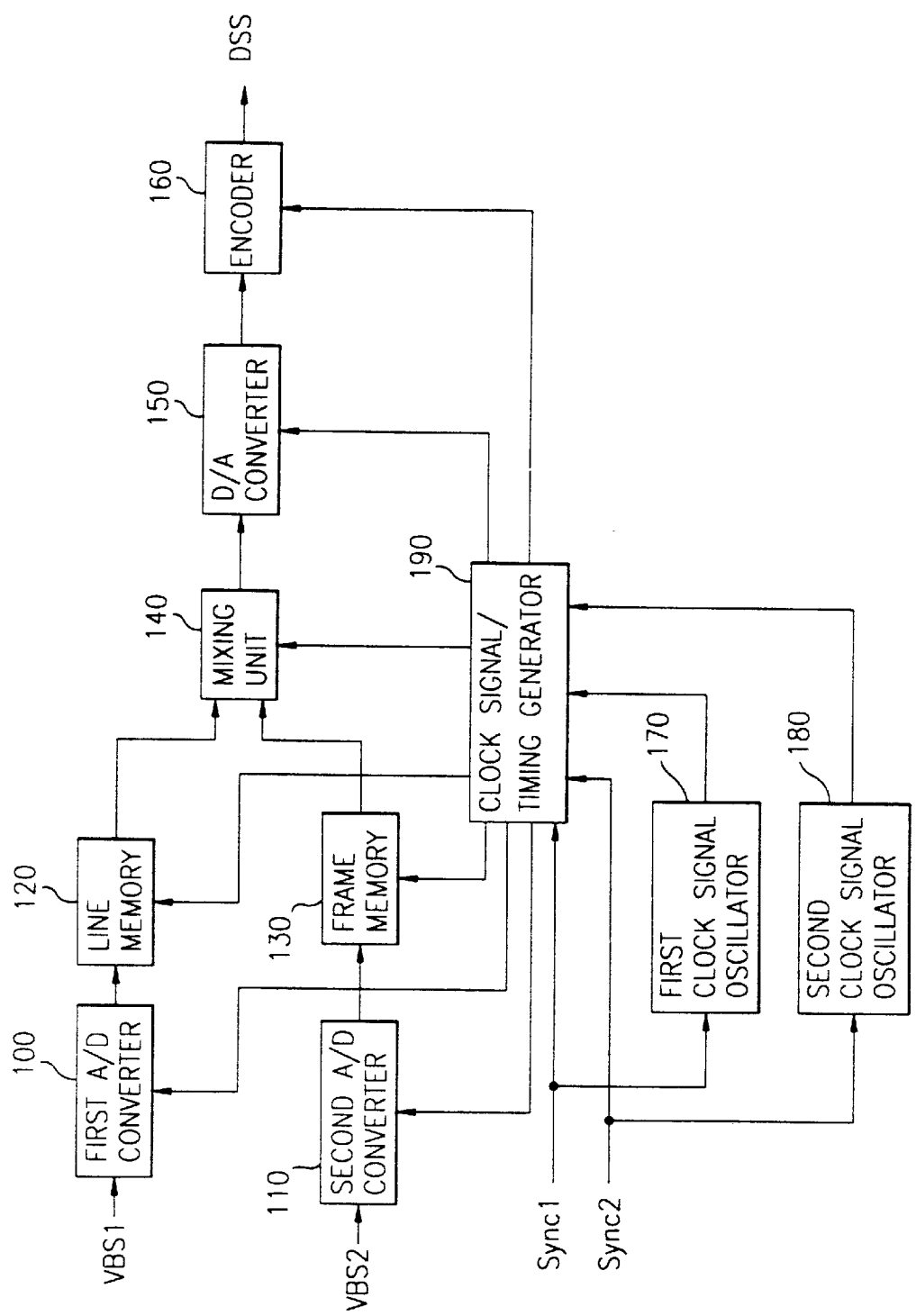
FIG. 1 is a block diagram showing an apparatus for composing two screens in a television according to the conventional art.

Then, the first write signal generator 281 receives the position control signal (PCS) for controlling the position of the screen to determine the position of the screen and applies to the line memory 220 the reset signal and the write enable signal synchronized with the synchronous signal for a main screen shown in FIGS. 4H-1 and 4H-2. Then, the line memory 220 stores the video signal (VBS1) for a main screen in the unit of lines.

Of the synchronous signal (Sync2) for a sub-screen shown in FIGS. 4B and 4J, the synchronous signal (Sync2) for a sub-screen shown in FIG. 4J is inputted to the second clock signal shifter 272, and serves as a reference clock signal (shown in FIG. 4K-1) and a reset signal (shown in FIG. 4K-2) from the second write signal generator 282 in accordance with a clock signal from the clock signal oscillator 275.

Then, the second write signal generator 282 receives the position control signal (PCS) for controlling the position of the screen to determine the position of the screen and applies the reset signal and the write enable signal shown in FIGS. 4D-1 and 4D-2 to the A/D converter 210 and the frame memory 230 and the clock signal shown in FIG. 4L. Then, the frame memory 230 stores the video signal (VBS2) for a sub-screen in the unit of frames.

When data on the line memory 220 and the frame memory 230 is read, the third clock signal shifter 273 receives the horizontal fly back signal (DHFB) for a double screens, and applies a reference clock signal and a reset signal to the read signal generator 284 in the control signal generator 280 in accordance with a clock signal the division ratio of which is varied to be N times as large as the VCO/PLL unit 274.

Accordingly, the read signal generator 284 applies the read enable signal for composing the screen that is vertically compressed N times to the line memory 220 and the frame memory 230, as shown in FIG. 4E, and applies each control signal to the mixing unit 240 and the D/A converter 250.

The VCO/PLL unit 274 receives a predetermined oscillating frequency from the clock signal oscillator 275 in accordance with the inputted division control signal (DCS), varies the division ratio and generates a clock signal having a dividing ratio N times as large as in a normal state. Then, the first and second clock shifters 271,272 make the clock signals generated by the clock signal oscillator 275 correspond to the the phase of the reference signal, and delay the value corresponding to the reference signal, resulting in preventing a jitter from being generated.

The field discriminator 283 receives the synchronous signal (Sync1,Sync2) for the main screen and the sub-screen, outputs a discriminating signal shown in FIG. 4C to the second write signal generator 282 and the read signal generator 284 to make the read signal generator 284 selectively output the read enable signal. Thus, the field discriminator 283 properly controls an outputting time of the line memory 220 and the frame memory 230.

Figure 5A:
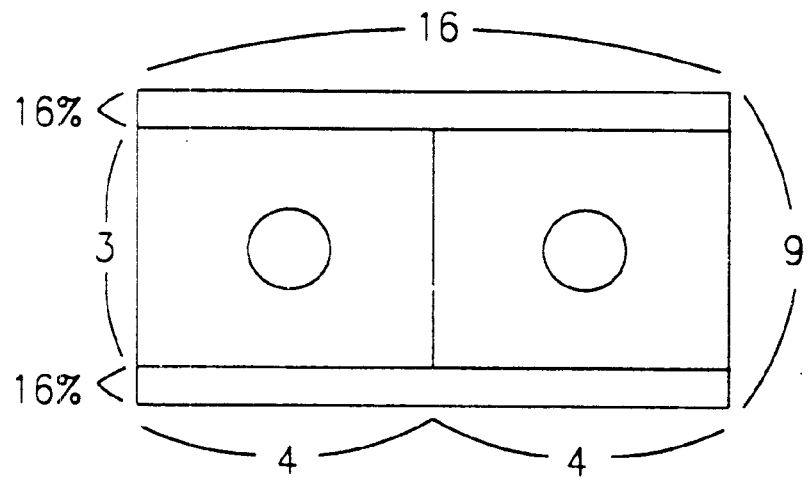
FIGS. 5A and 5B are views showing an composing state of each apparatus for composing two screens in a television according to the conventional art and the present invention, respectively.
Figure 5B:
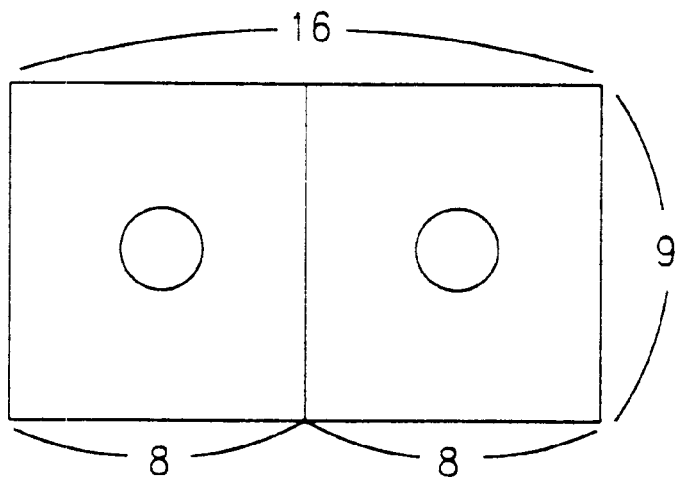

FIGS. 5A and 5B are views showing an composing state of an apparatus for composing two screens in a television according to the conventional art and the present invention, respectively. According to the conventional art in FIG. 5A, lower and upper spaces are shown when two 4:3 screens are displayed on the 16:9 screen. As shown in FIG. 5B, with no space shown in the upper and lower portions of the screen due to the horizontal fly back signal, two 4:3 screens can be displayed on the 16:9 screen in a full screen.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for composing two screens in a television, comprising:

a line memory for storing in the unit of lines a video signal for a main screen converted into a digital signal;

a frame memory for storing in the unit of frames a video signal for a sub-screen converted into a digital signal;

a mixing unit for receiving and mixing the outputs from the line memory and the frame memory to compose two screens;

a D/A converter for converting an output from the mixing unit into an analog signal;

an encoder for encoding an output from the D/A converter and outputting a double screen signal;

a clock signal generator for receiving the horizontal synchronous signals for a main screen and a sub-screen, generating a clock signal, respectively corresponding thereto, dividing a horizontal fly back signal in a predetermined number of signals in accordance with a division control signal and outputting the resultant signal;

wherein the clock signal generator comprises:

a first clock signal shifter for receiving the horizontal synchronous signal for a main screen;

a second clock signal shifter for receiving the horizontal synchronous signal for a sub-screen;

a third clock signal shifter for receiving said horizontal fly back signal; and a voltage control oscillator (VCO)/phase locked loop (PLL) unit and a clock signal oscillator for receiving the division control signal; and a control signal generator for receiving said respective clock signals from the clock signal generator to generate a clock signal and a timing pulse signal required in said line memory, said frame memory, said memory unit, said D/A converter and said encoder and generate a read enable signal in accordance with the clock signal divided in a predetermined number when the line memory and the frame memory carries out a reading operation.

2. The apparatus of claim 1, wherein the control signal generator comprises:

a first write signal generator for receiving an output signal and generating a first write signal;

a second write signal generator for receiving an output signal from the second clock signal shifter and generating a second write signal;

a field discriminator for receiving the horizontal synchronous signals for the main screen and the sub-screen and generating a discriminating signal; and a read signal generator for receiving an output signal from the third clock signal shifter, a discriminating signal from the field discriminator, the division control signal, and the position control signal.

3. An apparatus for composing two screens in a television, comprising a clock signal generator including a plurality of clock signal shifters, a VCO/PLL unit and a clock signal oscillator.

4. An apparatus for composing two screens in a television, as in claim 3, including a clock signal generator which comprises:

a first clock signal shifter for receiving the horizontal synchronous signal for a main screen;

a second clock signal shifter for receiving the horizontal synchronous signal for a sub-screen;

a third clock signal shifter for receiving said horizontal fly back signal; and a voltage control oscillator (VCO)/phase locked loop (PLL) unit and a clock signal oscillator for receiving the division control signal.

\* \* \* \* \*